Patented June 5, 1951

2,555,834

UNITED STATES PATENT OFFICE 2,555,834

COPOLYMERS OF FATTY OILS AND POLYALLYL ETHERS

John Robert Roach, Minneapolis, Minn., assignor to General Mills, Inc., a corporation of Delaware No Drawing. Application April 25, 1947,
Serial No. 744,041

5 Claims. (Cl. 260—17.4)

The present invention relates to copolymers of poly-unsaturated ethers with esters of unsaturated fatty acids. More particularly it relates to such copolymers which are particularly useful as synthetic drying oils useful as surface coatings and for impregnation of porous articles such as wood, cloth, paper, etc.

Numerous attempts have been made to improve the drying properties of naturally occurring oils. Some of these attempts involved the substitution of higher functional alcohols in place of the glycerol in the naturally occurring glycerides. Others involved conversion of non-conjugated oils to conjugated oils, and still further attempts involved the partial substitution of lower aliphatic unsaturated acids for part of the unsaturated fatty acids in a natural oil. Still other attempts in this direction involved the copolymerization of drying oils with various unsaturated compounds. In general, these various attempts have resulted in some improvement over the natural oils. All these prior attempts however, left much to be desired in view of the limited amount of unsaturation which has been added to the molecule, and in view of the fact that, for the large part, they involve the introduction of additional ester groups which are susceptible to hydrolysis.

It has now been discovered that excellent drying oils and similar materials may be made by copolymerizing poly-unsaturated ethers with esters of unsaturated fatty acids. By this means it is possible to materially increase the extent of unsaturation of the unsaturated esters by means of linkages which are particularly stable to hydrolysis, and which, accordingly, are relatively unaffected by water and various chemicals which normally effect hydrolysis.

It is, therefore, an object of the present invention to provide novel copolymers of poly-unsaturated ethers with esters of unsaturated fatty acids.

It is another object of the present invention to provide new synthetic drying oils which are copolymers of poly-unsaturated ethers with esters of unsaturated fatty acids.

As has been stated above, the present invention makes possible an increase in the effective unsaturation of an oil through the addition of poly-unsaturated ethers, such as allyl sucrose, which, by virtue of its ether type of linkage, increases the alkali resistance of the resulting copolymer. Another advantage of the present invention involves the wide variety of products obtainable through proper choice of the oil, and the poly-unsaturated ether; through the choice of different ratios of the two; and through regulation of the degree of copolymerization. This makes possible a synthetic drying oil which can be prepared to meet specifications in regard to viscosity, drying times, and performance. Moreover, the degree of copolymerization can readily be controlled so as to yield a partially copolymerized product which can be further processed into varnishes, enamels, paints, and other coating compositions. It is also possible to carry the copolymerization to a higher degree so as to produce a product of the degree of copolymerization ultimately desired, which product may then be dissolved in a suitable solvent and used as such. The viscosity of the product may likewise be controlled by varying the extent of copolymerization.

A further advantage of the present invention is the fact that the copolymerization time is relatively short. Likewise films from the copolymer products dry rapidly, both at room temperature and elevated temperatures of 30–100° C. Furthermore the copolymers of the present invention provide films that are hard and glossy even when prepared from as poor a drying oil as soybean oil, and the degree of hardness can be varied through choice of the oil and through altering the ratio of the poly-unsaturated ethers to oil.

The fatty acid esters which may be used in the copolymerization reaction may be practically any esters of such acids, part of which must be unsaturated. Preferably for economic reasons, the naturally occurring oils, such as drying or semi-drying oils, are preferred. Such oils as soybean oil, sunflower oil, linseed oil, perilla oil, oiticica oil, castor oil, dehydrated castor oil, tung oil, and the like, may be used. Similarly blown oils such as blown soybean oil may be used. It will be apparent, moreover, that reconstituted oils may be used, as, for example, reconstituted oils in which the glycerol portion of any of the above oils has been replaced by pentaerythritol, mannitol, sorbitol, etc., or oils reconstituted from a selected fraction of highly unsaturated fatty acids.

The poly-unsaturated ether may likewise be subject to considerable variation. Practically any poly-unsaturated ether may be used provided the compound is miscible with the ester at room temperature or at the reaction temperature or such that solubility and compatibility are obtained after the copolymerization reaction has been carried on to a slight extent. Typical of such ethers are the polyallyl, polyvinyl, and the substituted polyallyl and polyvinyl ethers, as well as mixed ethers containing more than one of the above mentioned groups per molecule. These ethers may be the poly-unsaturated ethers of such polyhydroxy compounds as glycerol, diglycerol, triglycerol, higher polyglycerols, the glycols, pentaerythritol, dipentaerythritol, higher polypentaerythritols, as well as other polyhydric alcohols resulting from the condensation of aldehydes and ketones, mannitol, sorbitol, glucosides, sucrose, etc., diallyl ether, divinyl ether, and the like. The degree of etherification or the degree of substitution (D. S.) of these ethers should be sufficiently high to make the product insoluble in water and soluble in such organic solvents as ethyl ether, benzene, etc. In general, it is preferred that at least ⅔ of the hydroxyl groups be etherified, although with the more highly functional sucrose molecule, for example, a product with a D. S. of 5 gives excellent copolymers. Consequently, depending upon the number of hydroxyl groups in the molecule, the number etherified should be somewhere between 60% and 100% of all the hydroxyl groups in the molecule. The higher the degree of substitution, the better the copolymers, since resistance to water, alkali, etc., is greatly increased.

The ratio of poly-unsaturated ether to oil may be varied according to the type of ultimate film desired. For the preparation of synthetic drying oils, it is desirable that the composition contain from about 10–50% of the poly-unsaturated ether and the remainder oil. Where higher ratios of the poly-unsaturated ethers are used, the film is more in the nature of a plasticized poly-unsaturated ether.

The preparation of the novel copolymers may be conducted in a very simple manner. The preparation may be accompanied by mixing the poly-unsaturated ether and the oil in the desired ratio, after which the mixture may be heated and blown with air until the desired degree of reaction has been obtained. The extent of reaction can be followed by determining the iodine number, refractive index, or preferably, viscosity. It is also possible, and in some instances advantageous, to blow the oil for a certain period of time before the poly-unsaturated compound is added, after which copolymerization is effected by additional blowing. The mixture is subjected to a continuously renewed stream of an oxygen-containing gas, as for example, air. In those instances where relatively volatile poly-unsaturated ether is employed, it may be necessary to operate under reflux.

The temperature of the reaction may be varied over a wide range, depending upon the ratio of monomer and the particular oil used, but excellent results have been obtained by operating at temperatures from about 50° C. to about 150° C., with the more desirable range being 95–140° C. from the point of view of rate of reaction. When the higher temperatures are used, the reaction proceeds much more rapidly, and, depending upon the oil used, the ratio of monomers, the viscosity desired, etc., the reaction may be terminated in 2 to 10 hours. This reaction time can be reduced even further through the addition of such catalysts as the Pb, Co, and Mn naphthenates.

The copolymers may be used as such, as a finished product, or they may be employed in the preparation of a paint, varnish, enamel, lacquer or other protective coating composition. The products are found to polymerize further to yield highly desirable films either spontaneously or in the presence of such catalysts as heat, light, ultraviolet radiation, oxygen, ozone, peroxides and metallic driers such as Pb, Co, Mn, etc., the metallic driers being generally used in the form of their fat-soluble salts such as the stearates or naphthenates, in order to accelerate the polymerization of protective coating films. In addition, a natural or synthetic resin may be heat blended with the partially polymerized product to give a useful coating composition.

The resulting films vary in physical properties, depending on the ratio of monomers and on the oil used. As a result, films can be obtained with a wide variety of properties to fit the various requirements. The films are hard, clear, transparent, glossy, and adherent. As compared to the original oils, the copolymers give films which have greatly reduced drying times and have improved resistance to water, acids, alkali and other chemicals. In addition, the films are much harder and stronger.

By this means it is possible to prepare a new synthetic drying oil from a semi-drying oil which is superior to the so-called drying oils. In addition, a comparable improvement in the drying oils can likewise be obtained.

*Example 1*

Methyl ethyl ketone (288 g.) and paraformaldehyde (780 g.) were condensed in water (3 l.) by the addition of calcium hydroxide (146 g.), with the temperature being maintained at 50–55° C. for two hours. The solution was cooled and filtered, made barely acid with acetic acid, and evaporated under reduced pressure. The residue was extracted with dry methanol (1 l.) and the solution filtered. Evaporation of the filtrate under reduced pressure yielded 742.8 g. of a colorless syrup with a hydroxyl content of 31.5%. This product (250 g.) was then heated with aqueous sodium hydroxide (50% conc., 840 g.) and allyl bromide (1200 g.) at the reflux temperature for 6 hours. There resulted 302 g. of the allyl ether of which 78% distilled to yield the polyallyl ether which was then copolymerized as follows.

This polyallyl ether having an iodine number of 261, was then copolymerized with alkali refined soybean oil by heating the mixture together and by blowing the resultant mixture with pure oxygen. The following table will illustrate the results obtained by variations in the relative proportions of unsaturated ether and soybean oil, and by variations in time.

| | Composition | Polymerization Time | Visc. |
|---|---|---|---|
| | | Hours | Centistokes |
| (a) | 75% allyl ether | 9.5 | 386 (at 98° C.) |
| (b) | 50% allyl ether | 12 | 340 (at 98° C.) |
| (c) | 25% allyl ether | 14 | 363 (at 98° C.) |

In the presence of metallic driers all three of the above products gave excellent films, with the products from all three runs giving hard, glossy, strong and excellent films. As the amount of soybean oil in the mixture is increased, it can be observed that the reaction time increases and the film, although still quite hard in run (c), becomes softer, as if plasticized. By way of comparison, straight soybean oil, whether blown, heat polymerized, or used as such in the presence of metallic driers, gave weak, cheesy films which never became tack free or dust free, regardless of drying time, even if baked at 70–100° C.

Example 2

A mixture of 80% soybean oil and 20% of the allyl ether described in Example 1, together with 0.05% cobalt and 0.05% manganese in the form of the naphthenates, was blown with air at a temperature of 98° C. At the end of 14.5 hours, a product was obtained which had a viscosity of 1200 centistokes at 25° C. and an iodine number of 117. The films were relatively strong and clear.

Example 3

Various mixtures of alkali refined soybean oil and allyl sucrose, the latter having a degree of substitution varying from 5 to 7, as shown in the following table, were copolymerized by blowing with air under the conditions and with the results indicated.

| No. | Allyl Sucrose | Temp. | Time | Color | $N_d^{25}$ | Visc. Cent., 30° C. or Gardner values | $I_2\#$ | OH | Acid# |
|---|---|---|---|---|---|---|---|---|---|
| | Per cent | ° C. | Hours | | | | | Per cent | |
| 1 | 0 | 135 | 15 | 7-8 | 1.4796 | 1,040 | 97 | 1.5 | 3.8 |
| 2 | 5 | 135 | 15 | 7 | 1.4809 | 1,100 | 105 | 0.8 | 2.1 |
| 3 | 10 | 135 | 14 | 7-8 | 1.4826 | 2,621 | 101 | 1.6 | 2.3 |
| 4 | 10 | 98 | 14.5 | 6-7 | 1.4821 | 1,070 | 105 | | |
| 5 | 20 | 135 | 6 | | | 1,200 | 125 | | |
| 6 | 20 | 98 | 11 | | | 460 | 135 | | |
| 7 | 20 | (¹) | 7.75 | | | 380 | | | |
| 8 | 20 | 125 | 7.75 | | | 596 | | | |
| 9 | 20 | 135 | 9.5 | 6-7 | 1.4849 | Z-6 | 106 | | |
| 10² | 20 | 135 | 8 | | | 1,650 | | | |
| 11² | 20 | 135 | 7 | | | 2,230 | 106 | 2.2 | |
| 12 | 30 | 135 | 8.5 | | 1.4842 | Z2 | 132 | | |
| 13 | 30 | 135 | 9.5 | 6-7 | 1.4849 | Z2-Z3 | 131 | 1.8 | 1.9 |
| 14 | 30 | 135 | 12 | 7 | | Z3 at 40° C. | 127 | 3.0 | 2.3 |
| 15 | 40 | 135 | 10.5 | 6 | | Z-Z1 | 158 | 2.5 | 1.3 |
| 16 | 50 | | | | | | | | |

¹ 4 hrs. at 98°, 3.75 hrs. at 130°.
² For the last three hours of runs #10 and #11, 0.05% cobalt and 0.05% manganese as the naphthenates were added. The allyl sucrose used in run #10 had a D. S. of 5.3 whereas that used in run #11 had a higher D. S., 6.0, which resulted in the higher viscosity for product 11 even though the reaction period was slightly shorter.

To those examples which did not already contain driers, metallic driers were added in the form of 0.05% cobalt and 0.05% manganese as the naphthenates, and films were cast with a doctor blade. The films prepared from the 50% and 40% allyl sucrose copolymers were fairly hard and strong after 7 hours at room temperature. After 24 hours at room temperature, they were very hard. The films from the 30% allyl sucrose copolymer were only slightly less hard, while the 20%, 10%, and 5% allyl sucrose copolymer films became progressively less hard, with the 20% film being comparable to linseed pentaerythritol films in hardness (Sward Rocker Hardness test). The above films showed excellent resistance to water and to 1% $H_2SO_4$, remaining clear and intact after 48 hours immersion. The films also showed good resistance to aqueous alkali.

Example 4

The following mixtures of allyl sucrose (D. S. 5–7) and linseed oil (alkali refined were heated at 98° C. and were blown with oxygen with the following results:

| Composition | Polymerization time | Viscosity in Centistokes at 98° C. |
|---|---|---|
| | Hours | |
| 0% allyl sucrose | 6.33 | 375 |
| 25% allyl sucrose | 6.5 | 420 |
| 50% allyl sucrose | 5.25 | 385 |
| 75% allyl sucrose | 4.33 | 412 |

In the presence of metallic driers all three of the above copolymers gave films which were tack free in 8 hours or less at room temperature while the film from the above 100% linseed oil preparation was still tacky after 60 hours at room temperature. All of the allyl sucrose copolymer films were clear, hard, glossy, and showed good adhesion. The hardness of the film was directly proportional to the amount of allyl sucrose in the mixture. The copolymer films dried rapidly (1 hr. or less) upon baking at 70° C.

Example 5

Various mixtures of linseed oil and allyl sucrose (D. S. values 5 to 7) were copolymerized by blowing with air under the following conditions and with the following results:

| No. | Allyl Sucrose | Temp. | Time | Viscosity 25° C. Gardner Values | $I_2\#$ | Color | OH |
|---|---|---|---|---|---|---|---|
| | Per cent | Degrees | Hours | | | | Per cent |
| 1 | 10 | 135 | 9 | W | 137 | 10 | 1.9 |
| 2 | 20 | 135 | 8 | X-Y | 144 | 9-10 | 2.7 |
| 3 | 30 | 135 | 7 | Z3 | 160 | 11-12 | 2.7 |
| 4 | 30 | 100-125 | 7 | V-W | 166 | 12 | 2.5 |
| 5 | 40 | 135 | 55 | Z-2 | 162 | 9 | 3.0 |
| 6 | 50 | 100 | 9 | U-V | 193 | 11-12 | 3.1 |

In the presence of cobalt and manganese the above copolymers containing 30, 40, and 50% allyl sucrose gave films which were relatively hard in eight hours or less at room temperature. The films containing only 10–20% allyl sucrose, although slower in drying, were hard, strong and excellent in appearance. Upon baking at 70° C., the copolymers containing 40 and 50% allyl sucrose were tack free to foil in one hour, the 20 and 30% allyl sucrose films in two hours and the 10% allyl sucrose film almost tack free to foil in three hours, the latter being considerably better than linseed pentaerythritol ester in hardness under a similar drying test. They showed good resistance to water and alkali.

Example 6

Various mixtures of allyl sorbitol (D. S.=4.5) and soybean oil were copolymerized by blowing with air under the following conditions and with the following results:

| No. | Allyl Sorbitol | Temp. | Time | Visc. 25° C. Gardner Values | I₂# | Color | OH |
|---|---|---|---|---|---|---|---|
| | Per cent | Degrees | Hours | | | | Per cent |
| 1 | 30 | 135 | 5.5 | Z-1 | 128.2 | 7-8 | 2.8 |
| 2 | 40 | 135 | 4 | Z6 | 123.1 | 6-7 | 4.1 |
| 3 | 50 | 135 | 3 | Z4 | 158.0 | 5-6 | 4.7 |

In the presence of cobalt and manganese driers the above copolymers were considerably slower in drying than were the allyl sucrose copolymers. However, the resulting films were very hard, strong, clear, light in color, and excellent in appearance. It can be noted likewise that the above copolymerization times are very short.

Example 7

It is also possible and often desirable to blow the oil at an elevated temperature before the addition of the poly-unsaturated compound. This serves to partially polymerize the oil and in addition decomposes the naturally occurring polymerization inhibitors present in the oil. In the following runs the soybean oil was first blown for 2.25 hours at 135° C. and then the allyl sucrose was added and the blowing continued with the following results:

| No. | Allyl Sucrose | Temp. | Time | Visc. 25° C. Gardner Values | I₂# | Color | OH |
|---|---|---|---|---|---|---|---|
| | Per cent | ° C. | Hours | | | | Per cent |
| 1 | 40 | 135 | 6.75 | V-W | 162 | 16-17 | 1.8 |
| 2¹ | 40 | 135 | 6.75 | Z3-Z4 | 147 | 17 | 1.9 |

¹ The allyl sucrose was added in three batches, approximately one-third at each addition. The film tests were comparable to those obtained in the above examples.

Example 8

For preparation of these copolymers the oils were first blown for 14 hours at 135° C. and then sufficient polyallyl ether was added to give a 50% polyallyl ether composition, with the remainder being added at intervals as the blowing was continued. The results for copolymerizations with allyl sucrose and blown soybean oil were as follows:

| Allyl Sucrose | Reaction time | Color | Viscosity Gardner Values | I₂# | OH |
|---|---|---|---|---|---|
| Per cent | Hours | | | | Per cent |
| 99 | 1.6 | 3-4 | >Z-6 | 240 | 1.6 |
| 95 | 4.5 | 4 | >Z-6 | 231 | 1.7 |
| 90 | 3.75 | 4 | Z3-Z4 | 237 | 3.4 |
| 82.5 | 4.5 | 5 | >Z-6 | 214 | 3.1 |

The above products at room temperature and in the presence of metallic driers gave films which were tack-free to foil in 5.75 to 7.5 hours. Upon baking at 70° C., all of the films were tack-free to foil in 30 minutes. The films were hard, clear, light in color, and were glossy.

Copolymers of blown castor oil and allyl sucrose were also prepared as indicated above. The results were as follows:

| Allyl Sucrose | Reaction time | Color | Viscosity Gardner Values | I₂# | OH |
|---|---|---|---|---|---|
| Per cent | Hours | | | | Per cent |
| 90 | 3.66 | 7 | >Z6 | 226 | 1.7 |
| 75 | 2.5 | 8 | Z5-Z6 | 201 | 3.8 |

The above products dried at room temperature in the presence of metallic driers to give films which were tack-free to foil in 6-7.5 hours. When baked at 70° C., the films were tack-free to foil in 30 minutes.

While various modifications of the above invention have been described, it is to be understood that this invention is not limited thereto, but may be varied within the scope of the following claims.

I claim as my invention:

1. The process of copolymerizing a polyhydric alcohol ester of an unsaturated higher fatty acid and a polyallyl ether of a polyhydric alcohol in which at least 60% of the hydroxyl groups have been allylated, which comprises heating a mixture of said ether and said ester to a temperature within the approximate range of 50–150° C., and blowing an oxygen-containing gas through said mixture until a homogeneous liquid soluble copolymer is formed.

2. Process according to claim 1 in which the temperature is within the approximate range of 95–140° C.

3. The process of copolymerizing a polyhydric alcohol ester of an unsaturated higher fatty acid and a polyallyl sucrose, 60% of the hydroxyl groups of which have been allylated, which comprises heating a mixture of said polyallyl sucrose and said ester to a temperature within the approximate range of 50–150° C., and blowing an oxygen-containing gas through said mixture until a homogeneous liquid soluble copolymer is formed.

4. A homogeneous liquid soluble copolymer of a polyhydric alcohol ester of an unsaturated higher fatty acid and a polyallyl ether of a polyhydric alcohol prepared according to the process of claim 1.

5. A homogeneous liquid soluble copolymer of a polyhydric alcohol ester of an unsaturated higher fatty acid and a polyallyl sucrose prepared according to the process of claim 3.

JOHN ROBERT ROACH.

(References on following page)

REFERENCES CITED

The following references are of record in the file of this patent:

UNITED STATES PATENTS

| Number | Name | Date |
|---|---|---|
| 2,037,740 | Salzberg | Apr. 21, 1936 |
| 2,298,078 | Wolff | Oct. 6, 1942 |
| 2,450,234 | Evans et al. | Sept. 28, 1948 |
| 2,460,255 | Harvey | Jan. 25, 1949 |

OTHER REFERENCES

Nichols et al.; Official Digest of Paint & Varnish Production Clubs (March 1945, pp. 111–123).